W. L. CLARK.
REAMING MACHINE.
APPLICATION FILED JUNE 21, 1916.
1,287,636.
Patented Dec. 17, 1918.
7 SHEETS—SHEET 6.
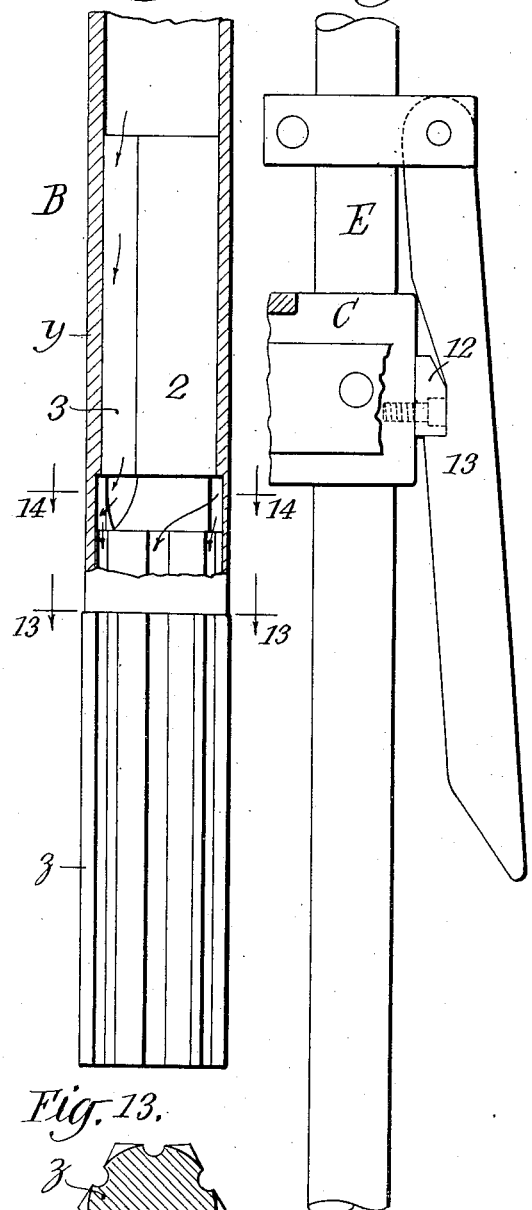
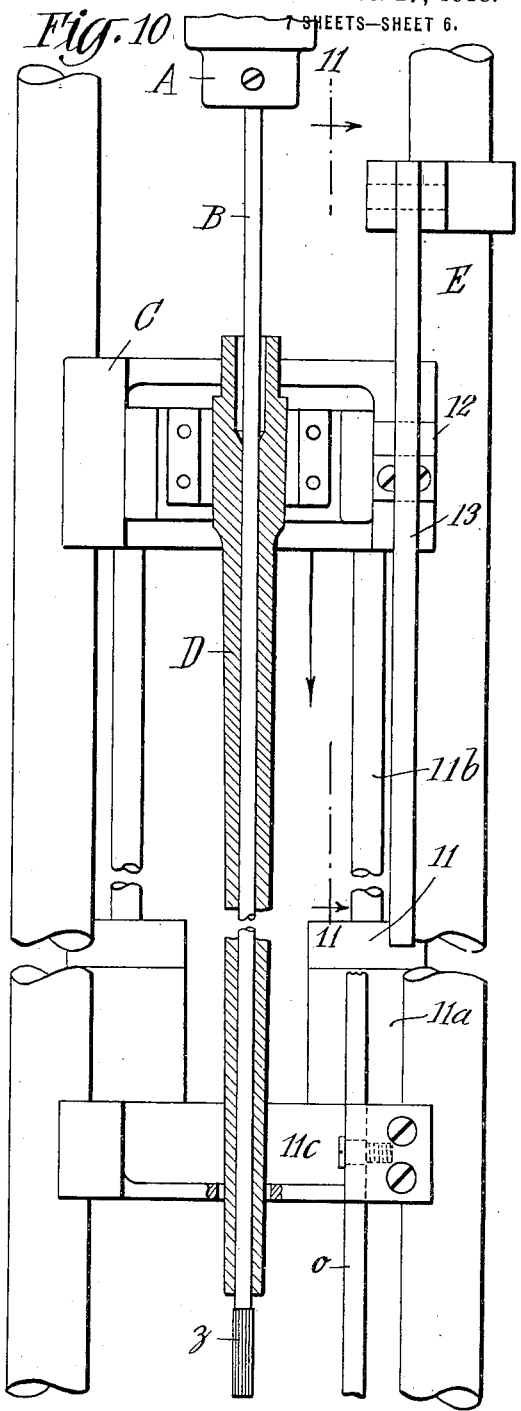
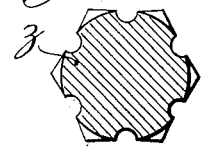
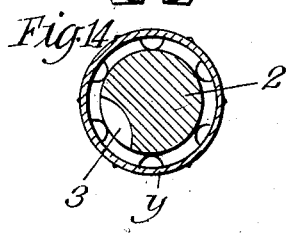
Walter L. Clark, INVENTOR
BY D. Anthony Usina, ATTORNEY INVENTOR
Walter L. Clark
BY
D. Anthony Usina, ATTORNEY

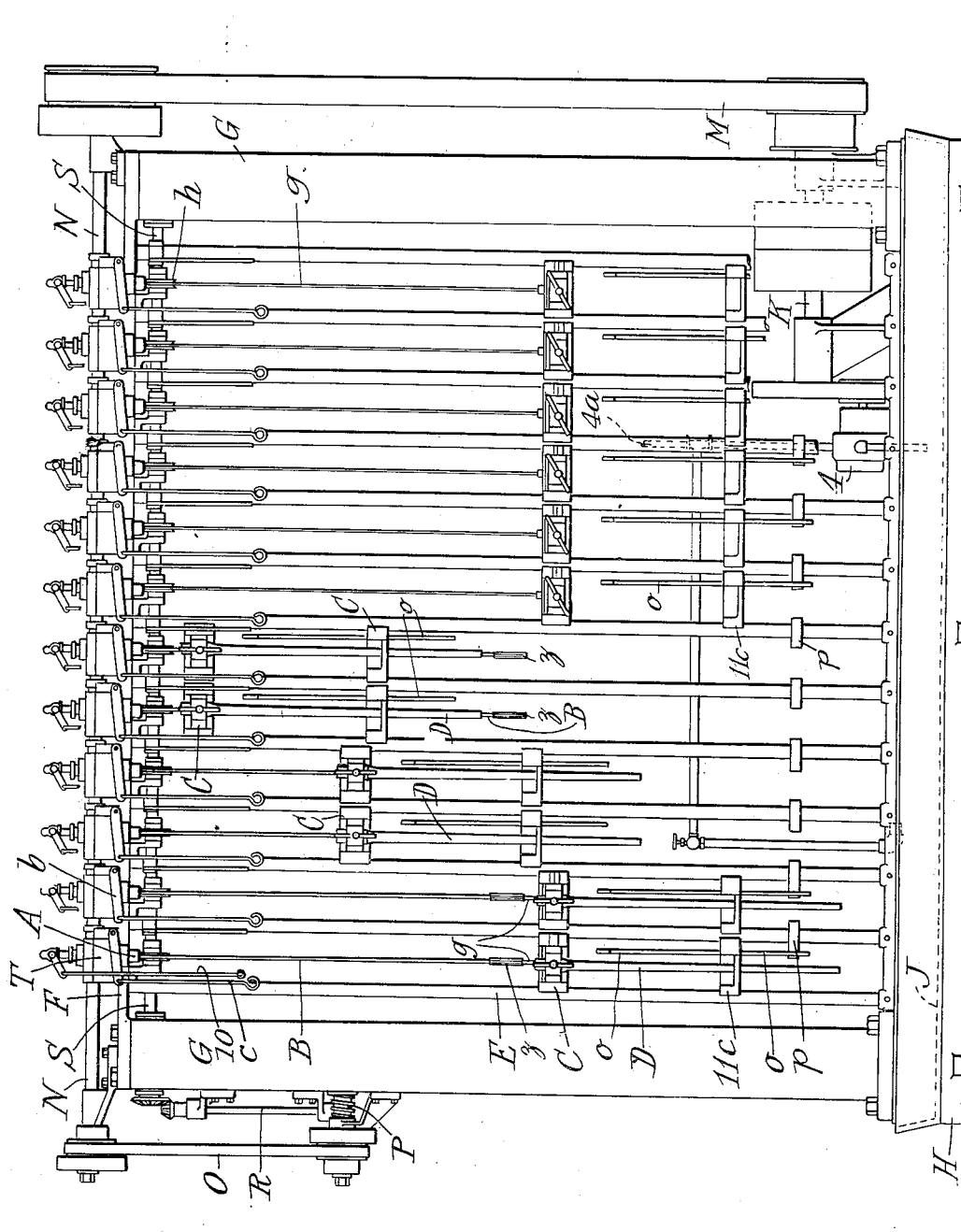

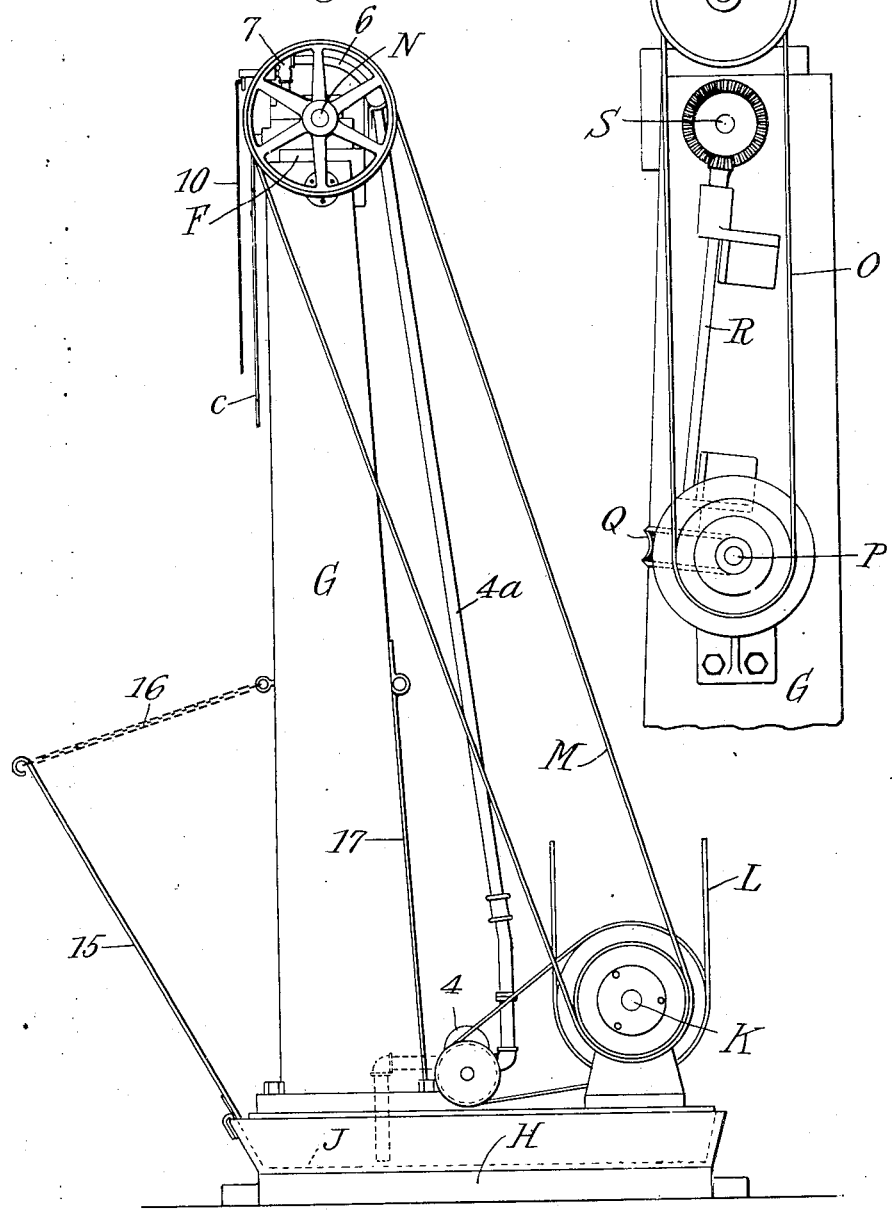

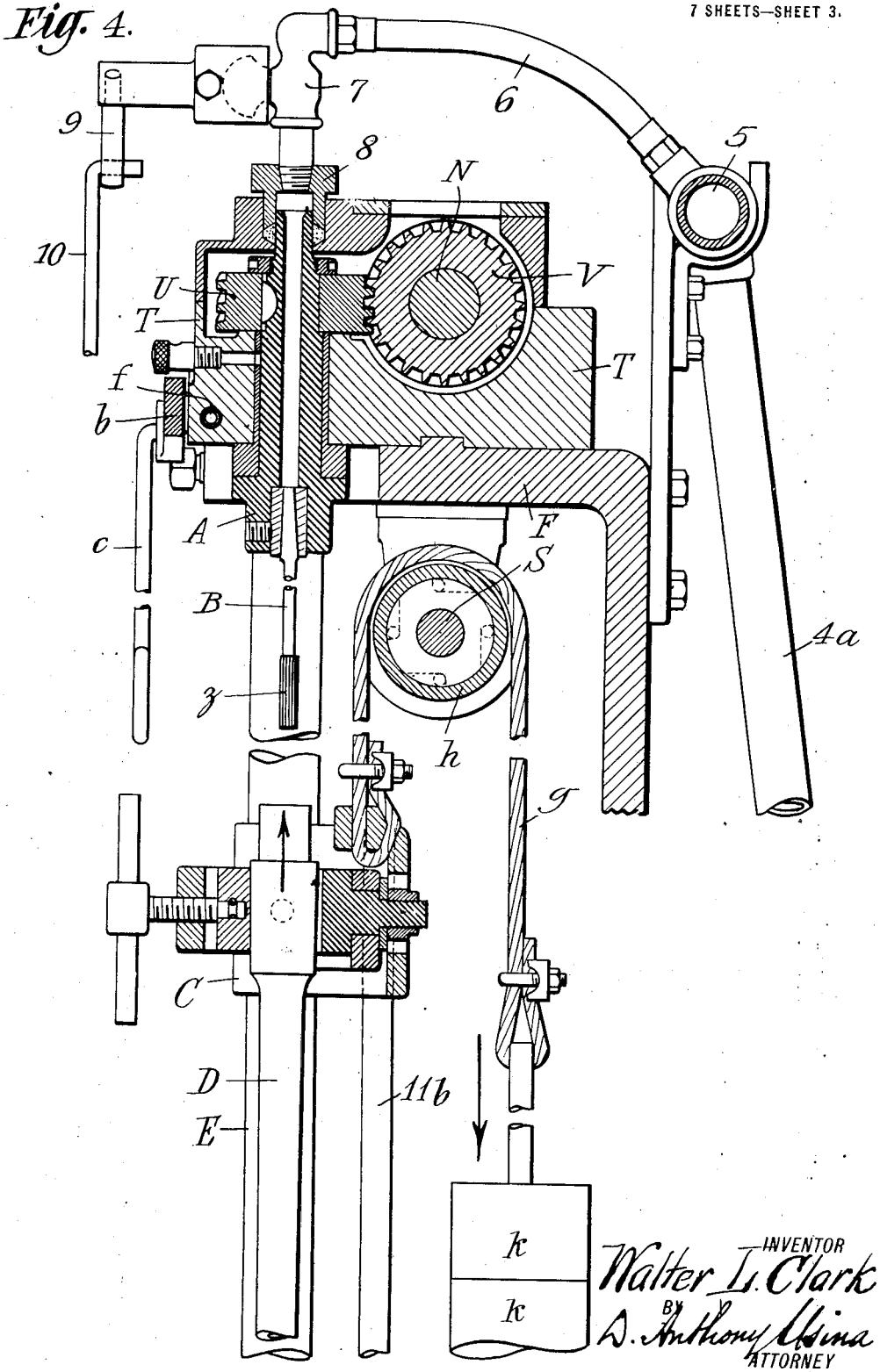

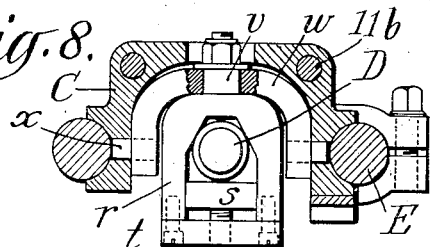
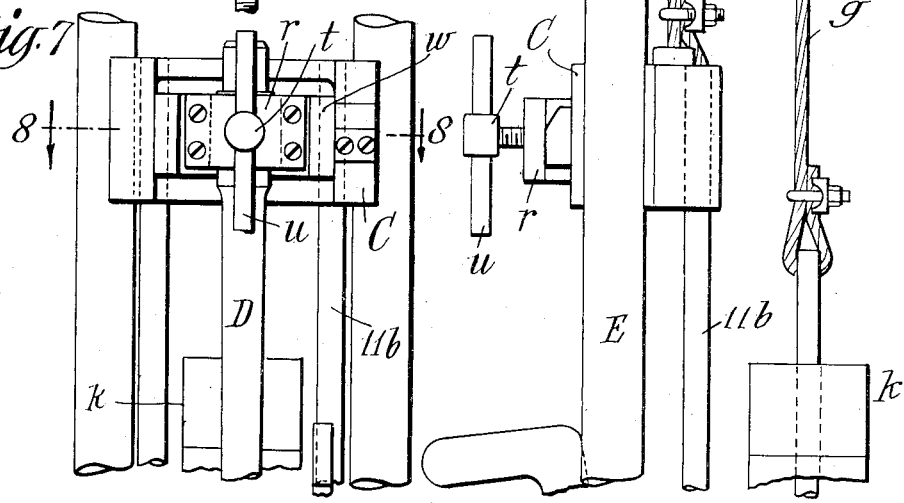
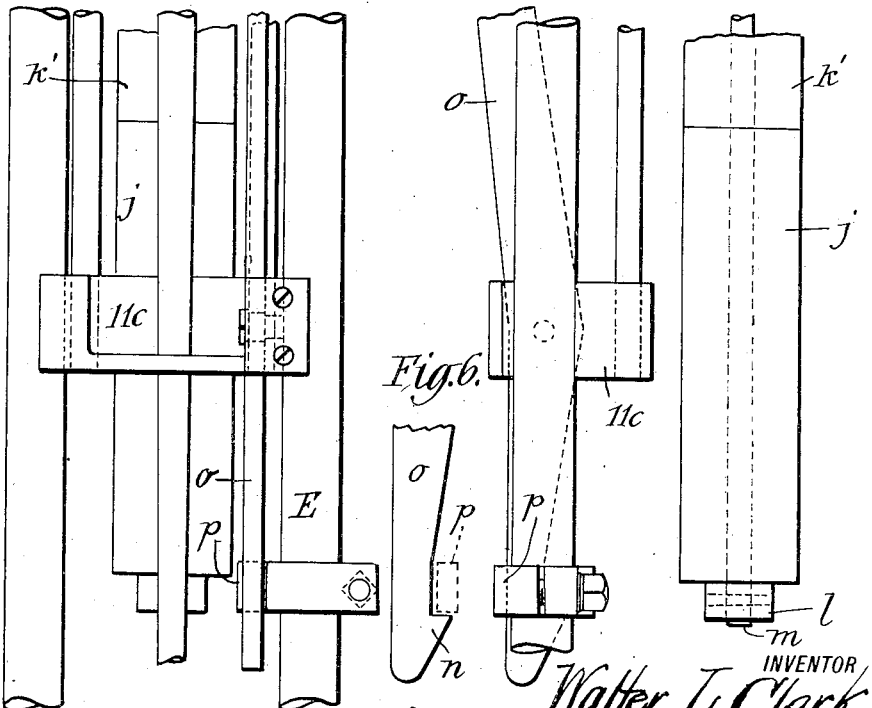

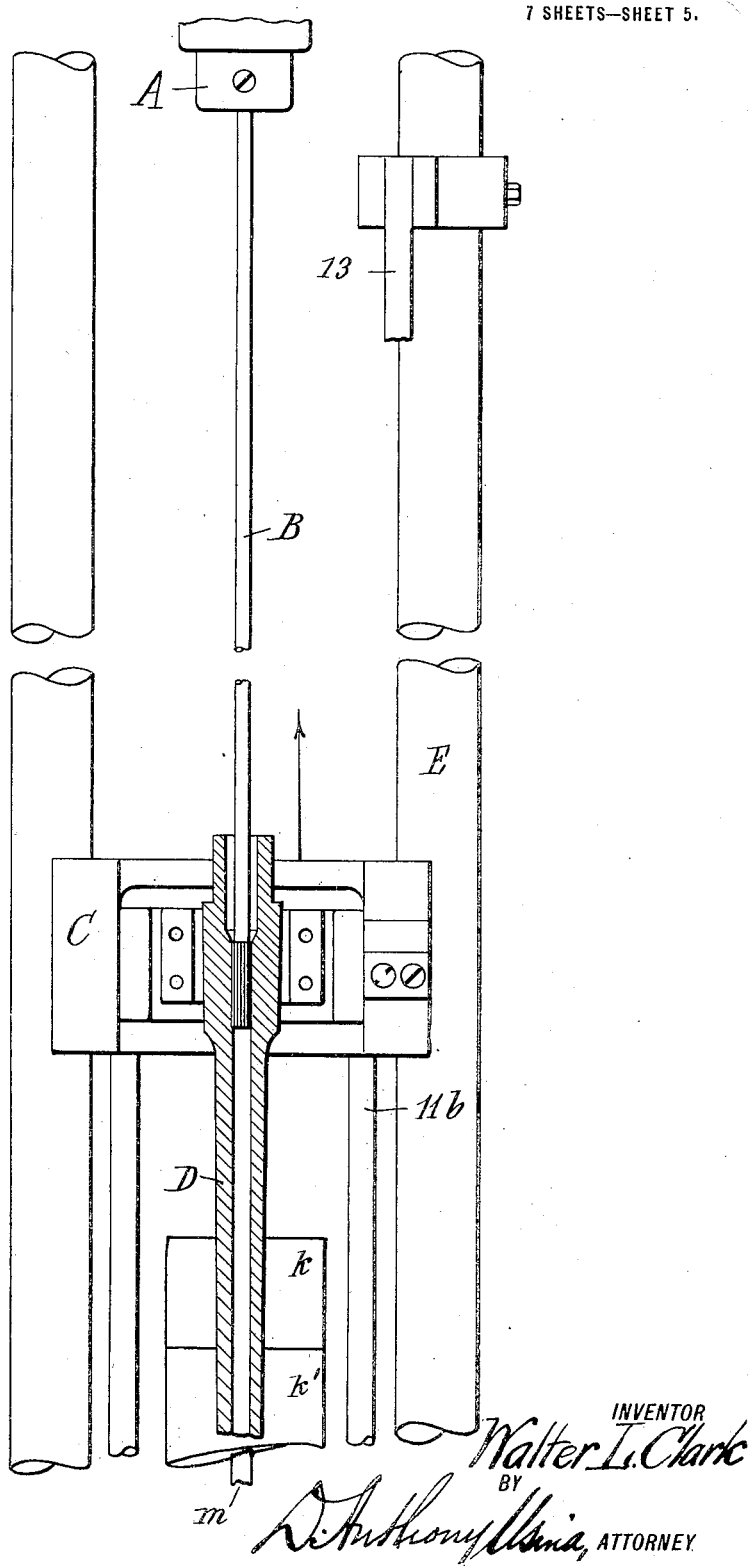

UNITED STATES PATENT OFFICE.

WALTER L. CLARK, OF SPRINGFIELD, MASSACHUSETTS.

REAMING-MACHINE.

1,287,636.         Specification of Letters Patent.         Patented Dec. 17, 1918.

Application filed June 21, 1916. Serial No. 104,862.

*To all whom it may concern:*

Be it known that I, WALTER L. CLARK, a citizen of the United States, residing in Springfield, Massachusetts, have invented certain new and useful Improvements in Reaming-Machines, of which the following is a specification.

This invention provides a machine which is especially adapted for reaming long holes and especially for reaming out the holes drilled in long narrow work-pieces such, for example, as rifle barrels and the like. It is adapted to operate on a comparatively large number of such work-pieces within a compact space so that a large output can be secured with a single operator to control the operation; or conversely a desired output can be secured under the control of a minimum number of operators. A plurality of reaming units are operated simultaneously, but independently of each other, and means are provided for automatically controlling the operation of each reamer when abnormal conditions arise. The operator is in fact little more than an attendant who inserts the work-pieces, starts the machine and removes each work-piece when the operations thereon are completed. Various other features of advantage are referred to hereinafter.

The accompanying drawings illustrate an embodiment of the invention.

Figure 1 is a face elevation of a machine designed to work on twelve rifle barrels at a time; the first two units at the left showing reamers and rifle barrels in starting position; the next two showing barrels about half done and the next two showing the completion of the reaming operation; the barrels and reamers being omitted from the other units so as to show the mechanism more clearly;

Fig. 2 is a right hand side elevation of the same machine;

Fig. 3 is a left hand side elevation of the upper portion thereof;

Fig. 4 is a transverse sectional view through one of the units;

Fig. 5 is a side elevation of the lower part of one of the units;

Fig. 6 is a side elevation of the lower end of a latch for holding down the carriage;

Fig. 7 is a front elevation of a carriage and adjacent parts;

Fig. 8 is a section of the same approximately on the line 8—8 of Fig. 7, showing certain interior parts of the carriage in plan;

Figs. 9 and 10 are face elevations, showing the barrel in section, of the beginning of a reaming operation, showing alternative methods of feed, the former showing a pushing feed and the latter a pulling feed;

Fig. 11 is a transverse view showing in side elevation a latch used in connection with the pulling feed of Fig. 10;

Fig. 12 is a side elevation, with the casing in section, of a reaming tool;

Figs. 13 and 14 are sections of the same on the correspondingly numbered lines in Fig. 12;

Figure 15:
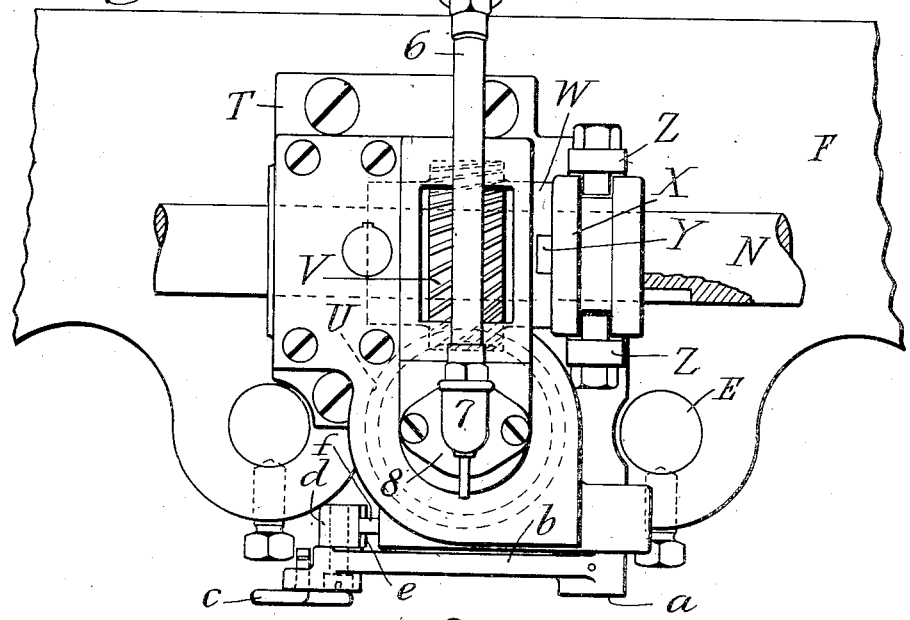
Fig. 15 is a top plan view of one of the reaming units.
Figure 16:
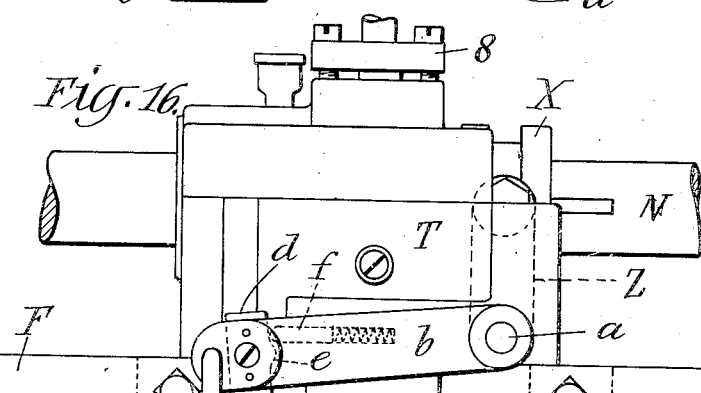
Fig. 16 is a front elevation of a chuck, showing also in section a pulley and automatic clutches relating thereto.

Referring to the embodiment of the invention illustrated it may be explained preliminarily that the operator will insert a barrel in the first carriage, bring it into engagement with the reamer and then start its chuck in rotation and release the carriage to permit the automatic impositive feed hereinafter described, after which he will pass to the successive carriages, repeating the same operations for each. As soon as the reaming of any barrel, whether the first or the last, or any intervening one, is completed the operator will withdraw it and insert a new one and start the rotation and feed, repeating such operations continuously; the machine being designed to do its work at about the same rate that one operator (or any calculated number of operators) can remove the finished barrels and keep it supplied with new barrels.

The machine illustrated consists of twelve independent units arranged alongside of one another on a common support and carrying the barrels adjacent to one another in upright positions and in a common vertical plane so as to be easily accessible. Each unit includes a chuck A at the upper end for carrying a reamer B, and a carriage, indicated as a whole at C for carrying a barrel D to be reamed. The chuck is given a rotary motion and the carriage a longitudinal or feeding motion. The frame of the machine comprises a number of upright guides E preferably heavy round rods on which the carriages C are guided. The upper ends of the guides are mounted in a head rail F which at its ends is carried on end posts G mounted on a base H carrying a trough J indicated in dotted lines in Fig. 2, into which the oil flows out of the lower ends of the barrels during the reaming operation. The power is derived from a shaft K mounted on the base of the machine and driven from a belt L (Fig. 2); this shaft carrying pulleys and a belt M for transmitting motion to an overhead driving shaft N from which the rotary movement is taken for the several chucks as well as a feed-controlling movement. For the rotary movement the shaft N may be operated in either direction. For the feed-control, however, it should be operated in one direction when a push feed is used and in the opposite direction for a pull feed. The reversal of direction can be secured very simply by crossing the belt M or by running it open. Change speed pulleys are shown for the belt M to adapt the machine for faster or slower work according to the character of the steel to be reamed, and other considerations. From the main shaft N motion is communicated through change speed pulleys and a belt O to a worm P which drives at a reduced rate a worm gear Q (Fig. 3) on a short shaft R which by further speed - reducing gears drives the feed-controlling shaft S.

Each chuck A is mounted in a suitable bushing on a block T (Figs. 4 and 15) and carries a spiral gear U which is in engagement with a corresponding gear V mounted loosely on the main driving shaft N and held against longitudinal movement thereon. The gear V is mounted on a hub W which is adapted to be brought into engagement with a clutch ring X splined on the shaft so as to rotate therewith and to have a limited sliding movement to engage its tooth Y with the hub W or to disengage it therefrom. The clutch X is reciprocated by a fork Z mounted on a transverse shaft $a$ which at the front of the machine carries an arm $b$ from which hangs an operating rod $c$ within easy reach of the operator. A block $d$ carried on the rear face of the arm $b$ has a projection $e$ adapted to ride past the spring pressed rod $f$ which is mounted in the fixed block T, so as to serve as an impositive lock for the clutch arm, insuring its being thrown completely either to the clutching position or to the unclutching position.

Each carriage C is fastened to the lower end of a cable $g$ which passes upward therefrom and over a pulley $h$ and carries at its opposite end a counterweight $j$ (Fig. 5) which substantially counterbalances the weight of the carriage and a barrel therein. When the carriage is to be pushed up against the reamer an additional operating weight or weights $k$, $k'$ are provided, being adapted for easy attachment to and detachment from the cable $g$ by removing the nut $l$ on the bottom of the rod $m$ which constitutes practically the lower end of the cable and which supports the weights thereon.

Before introducing a new barrel the operator will pull the carriage down by hand until the hook $n$ on the lower end of the latch $o$ engages a projection $p$ clamped on the adjacent guide E. The carriage will then be opened and a new barrel put in, after which the operator, by pushing the top of the latch $o$, will release the carriage and allow it to slide up easily until it brings the work into engagement with the end of the reamer. From this point the operating weights will force the work over the tool with sufficient force to secure the desired rate of feed. These weights produce an impositive feed, and the feed for each reaming unit of the machine is independent of the feed for the other units. As the metal is softer or the resistance less for any other reason, the feed is faster, and vice versa; a constant feeding pressure being maintained but not a forced movement.

Figures 17, 18:
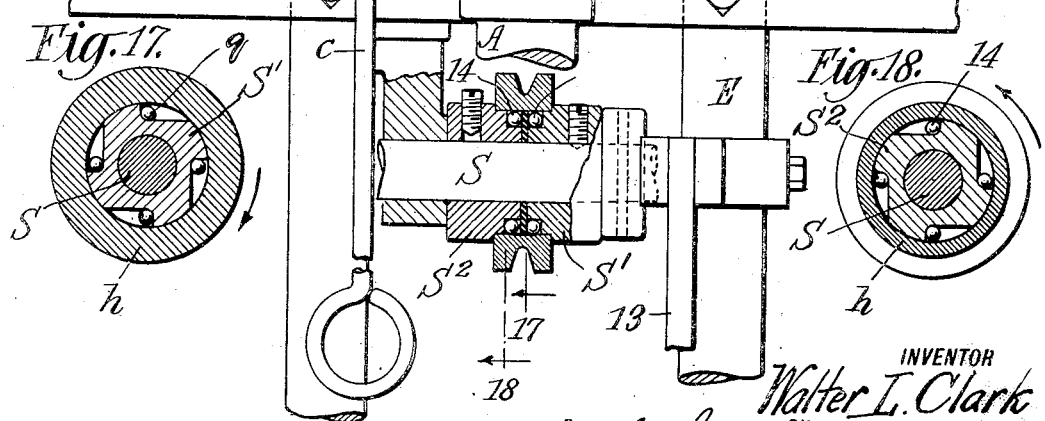
Figs. 17 and 18 are transverse sections of said clutches on the correspondingly numbered lines in Fig. 16; one of said clutches serving to control a pushing feed and the other a pulling feed.

In performing work of this sort, moreover, the tool is apt to find hard or soft spots in the work, or points in which the drilling is not absolutely accurate; and as the drill passes from a harder or a more constricted point in the length of the barrel there is a tendency for it to advance with a quickened motion (or rather for the barrel to advance in this way) with a liability of injury to the work or to the reamer. To avoid excessive speed at any point in the operation I provide means for putting a maximum limit on the feed so that I have not only the impositive or yielding feeding pressure, but I have also a limit on the speed with which it can operate. The weights will feed the barrel as slowly as its hardness necessitates. But when a soft spot or an enlarged bore arrives the movement of the pulley over which the operating cable G passes will be limited to a certain maximum by being automatically clutched to the feed-controlling shaft S. Fig. 4 shows the clutch in dotted lines and Fig. 17 shows a transverse section of the same. The parts rotate in the direction of the arrow (Fig.

17) and as long as the pulley $h$ is traveling faster than the shaft S the balls will be carried freely in the larger ends of the recesses in the clutch block S'. When, however, the pulley commences to travel faster than the shaft S the balls will be carried to the smaller ends of the slots and will jam there and prevent the pulley from turning faster than the shaft. Each of the carriages of the machine is separately controlled in this way so that the feed of each barrel is quite independent of that of the other barrels and is determined solely by the conditions which are best for the particular barrel in question.

For securing a good alinement of the work and the tool and maintaining such alinement throughout the operation the barrel D is carried in a trunnioned block of the carriage C. The block $r$, Figs. 7 and 8 has an opening in which the upper portion of the barrel D is clamped by means of a block $s$ actuated by a screw $t$ with a handle $u$. The block $r$ has a trunnion $v$ extending transversely through a U-shaped block $w$ which in turn is provided with trunnions $x$ extending into the sliding portions of the carriage C. Thus the barrel is free to swing transversely or sidewise and the tool may follow easily the direction of the hole drilled in the barrel.

The reamer indicated generally at B has a casing $y$ (Fig. 12) from which projects the lower end of the fluted cutter $z$. The upper end 2 of the cutter extends into the casing and has a vertical groove 3 through which the oil is fed freely to the cutter edges. The oil flows downward through the open end of the barrel and into the trough J (Figs. 1 and 2) thence it is raised by means of a pump 4 and pipe $4^a$ to a pipe 5 extending from end to end of the machine at the top as shown in Figs. 4 and 15 and having branches 6 which lead through cocks 7 to packing rings 8 which embrace the upper tubular ends of the chucks A which in turn carry the tubular shanks of the reamers. Each of the cocks 7 has clamped on it a lever 9 from which depends a rod 10 adapted to be pulled down or pushed up by the operator to admit or cut off oil from any one of the units desired. Ordinarily the removal of a finished barrel and the substitution of a new one takes so little time that the operator need not cut off the oil supplied to the unit in question while making the change. But if any unit is out of use for a considerable period the supply should be cut off.

It is preferable sometimes, especially where the hole to be reamed is of small diameter and shank of the reamer has to be of considerable length, to pull the reamer through the hole rather than to push it through, thus keeping the shank of the reamer in tension so that it is more certain to be kept straight than where the work is pushed against it. The present machine is designed to permit either a pulling or a pushing operation as desired, depending upon the character of the work, the shape of the reamer and other considerations. The machine has been described above as operating with a pushing feed. For a pulling feed the operating weights $k$, $k'$ of Fig. 5 will be removed, leaving the balancing weights $j$ on the cables, and equivalent operating weights will be placed on each carriage so as to pull it downward instead of pushing it upward. Such weights are shown in Fig. 10 at 11 and $11^a$. They are located on rods $11^b$ which extend downward from the rear of the carriage proper E to the rear of a sort of tail block $11^c$ of the carriage which is guided on the rods E so as to steady the carriage; the tail block having an opening through which the lower part of the barrel extends loosely and which prevents excessive swinging movement of the barrel. The weights 11 and $11^a$ tend to pull the carriage down with the same force with which the weights $k$, $k'$ tended to push it up. The feeding pressure is adjustable by using weights of different sizes, either for pushing or for pulling. For this case also the carriage is provided with a projection 12 (Fig. 11) adapted to be caught by the shoulder of a latch 13 which is mounted near the upper end of one of the guides E. In working the machine in this way the operator, first removing the reamer B from its chuck A, will slide the carriage up until it is caught by the latch 13. He will then insert the barrel and clamp it. The reamer B will then be introduced, passing its stem upward through the barrel and clamping its upper end in the chuck A. The latch 13 being then withdrawn the operator will lower the barrel until it engages the cutting end Z of the reamer and will operate the chuck which rotates the latter. Thereafter the operation will be automatic, the weights 11 and $11^a$ producing an impositive pulling feed. The clutch $S^2$ shown in Fig. 18 on the controlling shaft S will operate through balls 14 to put a maximum limit on the speed of rotation of the pulley H and consequently on the rate of feed. In this operation the shaft S will be rotating in the opposite direction from that in which it rotates during a pushing feed, the reversal being secured by crossing the main belt as above described. In each case (for Fig. 17 or for Fig. 18) the shaft S rotates in the same direction as the pulley $h$ and when one of the clutches as S' is operative the other, as $S^2$, is idle.

The apron 15 (Fig. 2) is arranged at the front of the machine to prevent splashing of oil on the workmen, being pivoted at its lower edge and being fastened at its upper edge by a chain 16 so that the operator can lean forward and the apron will swing inward as he bears against it. An apron 17 is also provided at the rear of the reaming mechanism, hinged at its upper edge so that it will rest approximately vertical and will prevent splashing of the oil in the backward direction.

Though I have described with great particularity of detail a certain embodiment of my invention yet it is not to be understood therefrom that the invention is restricted to the particular embodiment disclosed. Various modifications thereof in detail and in the arrangement of the parts may be made by those skilled in the art without departing from the invention as defined in the following claims.

What I claim is:

1. A reaming machine including in combination a plurality of reaming units arranged alongside of each other and adapted to hold a corresponding number of long narrow workpieces within easy reach of the same operator, said units operating in a vertical direction and having a separate automatic impositive feeding means for each unit, so that the rate of feed in the several units may vary according to the conditions, said feeding means being adapted to permit a separation between the reamer and the work by a movement of one vertically beyond the other, so that a single operator can readily withdraw such workpieces as they are completed and reinsert others.

2. A reaming machine including feeding mechanism the feed of which is determined by the resistance of the work.

3. A reaming machine including weight-driven feeding means.

4. A reaming machine including in combination a plurality of reaming units arranged alongside of each other and adapted to hold a corresponding number of long narrow workpieces within easy reach of the same operator, said units operating in a vertical direction and having a separate feeding means for each unit, said feeding means being adapted to permit a separation between the reamer and the work by a movement of one vertically beyond the other, so that a single operator can readily withdraw such workpieces as they are completed and reinsert others and a plurality of upright guides for said units, each unit comprising a rotating chuck at one end of said guides and a carriage sliding on said guides.

5. A reaming machine including in combination a plurality of reaming units arranged alongside of each other and adapted to hold a corresponding number of long narrow workpieces within easy reach of the same operator, said units operating in a vertical direction and having a separate feeding means for each unit, said feeding means being adapted to permit a separation between the reamer and the work by a movement of one vertically beyond the other, so that a single operator can readily withdraw such workpieces as they are completed and reinsert others and a plurality of upright guides for said units, each unit comprising a rotating chuck at one end of said guides and a carriage sliding on said guides, and said feeding means giving to each carriage a feeding movement dependent on the resistance of its work and independent of the feed of the others.

6. A reaming machine including in combination a plurality of upright guides, a plurality of reaming units on said guides and arranged alongside of each other and adapted to hold a corresponding number of long narrow workpieces within easy reach of the same operator, each unit comprising a rotating chuck at one end of said guides and a carriage sliding on said guides, said units operating in a vertical direction and having a separate feeding means for each unit comprising a pulley and a weight suspended from a cable passing over said pulley to its carriage, said feeding means being adapted to permit a separation between the reamer and the work by a movement of one vertically beyond the other, so that a single operator can readily withdraw such workpieces as they are completed and reinsert others, and a continuously rotating shaft passing through the pulleys of the several units and carrying for each pulley a clutch adapted to engage the pulley when it rotates as fast as the shaft and thus to prevent faster rotation.

7. A reaming machine including in combination a carriage, a counterweight for balancing the same and feeding means adapted to be applied to the counterweight to cause a feed in one direction or to the carriage to cause a feed in the opposite direction.

8. A reaming machine including in combination a carriage, vertical guiding means therefor and means for feeding said carriage to a position beyond the end of the reamer, said carriage adapted to hold the upper end of the work and to permit it to swing.

9. A reaming machine including in combination a carriage, vertical guiding means therefor and means for feeding said carriage to a position beyond the end of the reamer, said carriage adapted to hold the upper end of the work and to permit it to swing, and means for limiting such swinging movement.

10. A reaming machine including in combination a carriage, an impositive feeding means operating said carriage and means for limiting the maximum rate of such operation.

11. A reaming machine including in combination a feeding means adapted to be retarded in proportion to the resistance of the work and means for limiting the maximum rate of feed.

12. A reaming machine including in combination a feeding means comprising a weight and a cable passing over a pulley and a continuously rotating shaft passing through said pulley and carrying a clutch adapted to engage said pulley when it rotates as fast as the shaft and thus to prevent faster rotation.

In witness whereof, I have hereunto set my hand.

WALTER L. CLARK.